(12) United States Patent
Kuroda

(10) Patent No.: US 8,827,481 B2
(45) Date of Patent: Sep. 9, 2014

(54) ILLUMINATION DEVICE, DISPLAY DEVICE, AND TELEVISION RECEPTION DEVICE

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/983,181

(22) PCT Filed: Feb. 9, 2012

(86) PCT No.: PCT/JP2012/052954
§ 371 (c)(1),
(2), (4) Date: Aug. 1, 2013

(87) PCT Pub. No.: WO2012/111521
PCT Pub. Date: Aug. 23, 2012

(65) Prior Publication Data
US 2013/0314612 A1 Nov. 28, 2013

(30) Foreign Application Priority Data
Feb. 16, 2011 (JP) .................. 2011-031106

(51) Int. Cl.
*G02F 1/1335* (2006.01)
*G02F 1/1333* (2006.01)

(52) U.S. Cl.
CPC .... *G02F 1/133602* (2013.01); *G02F 1/133611* (2013.01); *G02F 2201/54* (2013.01); *G02F 1/133604* (2013.01); *G02F 1/133603* (2013.01); *G02F 1/133308* (2013.01); *G02F 2001/133317* (2013.01)
USPC .......................... 362/97.2; 362/97.1; 348/739

(58) Field of Classification Search
USPC .................. 362/97.2, 612, 602, 606; 348/739
See application file for complete search history.

(56) References Cited

U.S. PATENT DOCUMENTS

| | | | | |
|---|---|---|---|---|
| 7,628,527 B2* | 12/2009 | Kim et al. | ...................... | 362/621 |
| 2004/0141104 A1* | 7/2004 | Yu et al. | .......................... | 349/65 |
| 2010/0315803 A1* | 12/2010 | Inoue et al. | .................. | 362/97.1 |
| 2012/0281155 A1* | 11/2012 | Takano | ........................ | 348/790 |
| 2012/0300138 A1* | 11/2012 | Takano | ........................ | 348/739 |

FOREIGN PATENT DOCUMENTS

JP 2008-26669 A 2/2008

\* cited by examiner

*Primary Examiner* — Tracie Y Green
(74) *Attorney, Agent, or Firm* — Chen Yoshimura LLP

(57) ABSTRACT

An illumination device according to the present invention is provided with: a chassis (14); a cold-cathode tube (17); an optical member (15); a clamping member (30) that is provided at an aperture edge (14*b*) of the chassis (14), has a supporting section (36) and a frame (16), and moves together with the deformation of the chassis (14); and a buffer part (31) that is disposed between the optical member (15) and the frame (16), wherein the buffer part (31) is provided with a plurality of mountain-shaped protrusions (32) arrayed in parallel in the peripheral direction of the aperture edge (14*b*) and having a mountain shape in a cross section and a rectangular shape in a plan view, the mountain-shaped protrusion having top parts thereof contacting the optical member (15), and wherein, in the mountain-shaped protrusions (32), of the two inclined surfaces constituting each mountain-shaped protrusion (32) in a cross-sectional view, a first inclination angle (θ1) formed by the optical member (15) and a first inclined surface (34) oriented towards an edge of the chassis (14) is greater than a second inclination angle (θ2) formed by the optical member (15) and a second inclined surface (33) oriented towards the center of the chassis (14).

12 Claims, 14 Drawing Sheets

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

A liquid crystal panel used in a liquid crystal display device such as a liquid crystal television, for example, does not emit light, and thus, it is necessary to provide a separate backlight device as an illumination device.

Patent Document 1 discloses a configuration of a backlight device that includes: a chassis (backlight shield) that has a side thereof facing a liquid crystal panel open; a light source stored in the chassis; a plurality of optical members (optical sheets for a liquid crystal panel) disposed so as to cover the opening of the chassis; and a clamping member made of a bezel and the chassis and clamping the optical members. Each of the optical members disclosed in Patent Document 1 has elastic protrusions on the outer edges thereof such that the stacked plurality of optical members are elastically held in place in the backlight device, thereby making it possible to absorb the thermal expansion of the optical members.

RELATED ART DOCUMENT

Patent Document

Patent Document 1: Japanese Patent Application Laid-Open Publication No. 2008-26669

Problems to be Solved by the Invention

When the optical members are elastically clamped by the clamping member, that is, when the optical members are clamped in such a manner that the relative positions of the clamping member and the optical members can be changed, by the chassis being deformed (due to thermal expansion, thermal contraction, or the like), for example, the clamping member, which moves together with the chassis, is possibly moved from a proper position relative to the optical members.

Generally, the chassis is disposed closer to a heat generating source such as a light source and a circuit board that drives the light source than the optical members disposed so as to cover the opening of the chassis, and because the chassis is often made of a metal, the heat conductivity thereof is higher than that of the optical members made of a synthetic resin. Therefore, the chassis is heated and cooled faster than the optical members, and when the backlight device is turned on, the chassis starts thermal expansion before the optical members do. Also, when the backlight device is turned off, the chassis starts thermal contraction before the optical members do. As described above, the chassis and the optical members start thermal expansion or contraction at different timings from each other, and as a result, the clamping member, which moves in accordance with the chassis, and the optical members are caused to be misaligned to each other.

When the misalignment between the clamping member and the optical members occurs, the portion of the clamping member in contact with the optical members can be caught by small protrusions and recesses on the surface of the optical members, and in such a case, the clamping member moves while pulling the optical members in the same direction in which the clamping member moves. Therefore, the clamping member, which moves in accordance with the chassis, is likely to pull the optical members in the expansion direction or the contraction direction of the chassis, as a result of the temperature change of the chassis. If the optical members are pulled by the clamping member more easily in the contraction direction than in the expansion direction of the chassis, for example, the optical members are caused to warp or have wrinkles, resulting in a problem.

SUMMARY OF THE INVENTION

The present invention was completed in view of the above-mentioned situation, and an object thereof is to prevent the optical member from warping or having wrinkles as a result of a temperature change.

Means for Solving the Problems

In order to solve the above-mentioned problems, an illumination device of the present invention includes: a chassis that has an aperture on a light-emitting side, a light source that is stored in the chassis; an optical member that is disposed on the light-emitting side relative to the light source, the optical member covering the aperture of the chassis; a clamping member that is disposed at an edge of the aperture of the chassis, the clamping member having a first part for engaging the optical member from a side thereof facing the light source, and a second part for engaging the optical member from the light-emitting side, the clamping member being deformed in accordance with a deformation of the chassis; and a buffer part disposed in at least one of spaces between the optical member and the first part and between the optical member and the second part, wherein the buffer part has a plurality of mountain-shaped protrusions aligned along a periphery of the edge of the aperture, each of the mountain-shaped protrusions having a rectangular shape in a plan view and a mountain shape in a cross-sectional view and having a top part thereof in contact with the optical member, and wherein the mountain-shaped protrusions are configured such that, in a cross-sectional view, each of the mountain-shaped protrusions is constituted of two inclined surfaces, and a first inclination angle formed by the optical member and a first inclined surface of the two inclined surfaces that is inclined toward an edge of the chassis is larger than a second inclination angle formed by the optical member and a second inclined surface of the two inclined surfaces that is inclined toward a center of the chassis.

In the above-mentioned illumination device, the first inclination angle of the mountain-shaped protrusion is larger than the second inclination angle, and because the first inclined surface side of the mountain-shaped protrusion is more likely to be caught by the surface of the optical member as compared with the second inclined surface side, it is possible to prevent the optical member from warping or having wrinkles as a result of a temperature change.

Specifically, when the chassis undergoes thermal expansion as a result of the illumination device being turned on, the first inclined surface side of the mountain-shaped protrusion, which moves together with the chassis, is caught by the optical member, which causes the optical member to be pulled in the expansion direction more easily. On the other hand, when the chassis is cooled down and contracts as a result of the illumination device being turned off, the second inclined surface side of the mountain-shaped protrusion, which moves together with the chassis, is less likely to be caught by the optical member, and therefore, the optical member is less likely to be pulled in the contraction direction. Thus, when the chassis expands and contracts due to the illumination device being turned on and off, the optical member is pulled from the center toward each edge of the chassis more easily, and therefore, the optical member is less susceptible to warping or wrinkles.

The first inclination angle is formed by the first inclined surface and the optical member, and is an angle formed in a direction opposite to the mountain-shaped protrusion. The second inclination angle is formed by the second inclined surface and the optical member, and is an angle formed in a direction opposite to the mountain-shaped protrusion.

In the above-mentioned configuration, the buffer part may be disposed along the entire periphery of the aperture, and the mountain-shaped protrusions may be aligned such that the second inclined surface is inclined toward the center of the chassis, and the first inclined surface is inclined toward an outside of the chassis.

With this configuration, the mountain-shaped protrusions, which move together with the chassis, are most likely to be caught by the optical member when they move in a direction toward the outside of the chassis. Because the mountain-shaped protrusions are disposed along the entire periphery of the aperture edges of the chassis, the mountain-shaped protrusions are caught by the optical member along the entire periphery of the chassis. Therefore, when the chassis expands or contracts, the optical member is more likely to be pulled radially from the center to the outside of the chassis at the entire periphery of the aperture edges. Therefore, it is possible to prevent the warping or wrinkles of the optical member even more reliably in the area near the center of the chassis where the optical member is especially susceptible to the warping or wrinkles.

In the above-mentioned configuration, the optical member may have recesses formed thereon so as to catch mountain-shaped parts of the mountain-shaped protrusions.

With this configuration, the first inclined surface side of the mountain-shaped protrusions becomes more likely to be caught by the recesses provided on the optical member, and it is possible to prevent the optical member from warping or having wrinkles even more reliably.

In the above-mentioned configuration, the recesses may be provided by bonding a sticker having recesses and protrusions on a surface thereof to the optical member.

With this configuration, the recesses can be formed with ease.

In the above-mentioned configuration, the recesses may be formed integrally with the optical member.

With this configuration, it is not necessary to manufacture a member that has recesses, separately from the optical member, and therefore, it is possible to reduce the number of components.

In the above-mentioned configuration, the buffer part may be made of a first layer that is positioned closer to the optical member and a second layer that is positioned closer to the first part or the second part, and the second layer may be made of a material that is harder than the first layer.

With this configuration, the rigidity of the buffer part can be improved while ensuring the elasticity of the portion of the buffer part in contact with the optical member, and therefore, it is possible to prevent a pressing force of the buffer part acting on the optical member from being reduced due to the deformation of the buffer part. As a result, a reduction in force that pulls the optical member from the center of the illumination device toward an edge thereof can be mitigated, thereby preventing the optical member from warping or having wrinkles even more reliably.

In the above-mentioned configuration, the second layer may be configured such that a portion thereof positioned closer to the center of the chassis is thicker than a portion thereof positioned closer to an edge of the chassis.

With this configuration, the rigidity of the buffer part can be improved in the center of the chassis as compared to the edge thereof, which makes it possible to prevent the optical member from warping or having wrinkles in the area near the center of the chassis where the optical member is especially susceptible to warping or wrinkles.

In the above-mentioned configuration, on the second inclined surface, a low friction layer made of a material having a small friction coefficient may be formed.

With this configuration, it is possible to make the second inclined surface side even less likely to be caught by the optical member, which prevents the optical member from warping or having wrinkles even more reliably.

In the above-mentioned configuration, the first part may be a supporting section that is a portion of the chassis outside of the edge of the aperture and that is configured to support at least the optical member, and the second part may be a frame that extends along the supporting section and that is affixed to the supporting section.

With this configuration, the clamping member can be obtained by simply affixing the frame to the supporting section, and it is possible to clamp the optical member with a simple configuration.

Next, in order to achieve the above-mentioned object, a display device of the present invention includes the above-mentioned illumination device and a display panel that performs display by using light from the illumination device.

With this display device, because the optical member of the illumination device that supplies light to the display panel is less susceptible to warping or wrinkles, it is possible to prevent display unevenness and the like.

Examples of the display panel include a liquid crystal panel. As a liquid crystal display device, such a display device can be applied to various applications such as a television or the display of a personal computer, for example, and is particularly suitable for large screens.

Effects of the Invention

According to the present invention, it is possible to prevent the optical member from warping or having wrinkles due to a temperature change.

DETAILED DESCRIPTION OF EMBODIMENTS

Embodiment 1

Embodiment 1 of the present invention will be described with reference to FIGS. 1 to 6.

Figure 1:
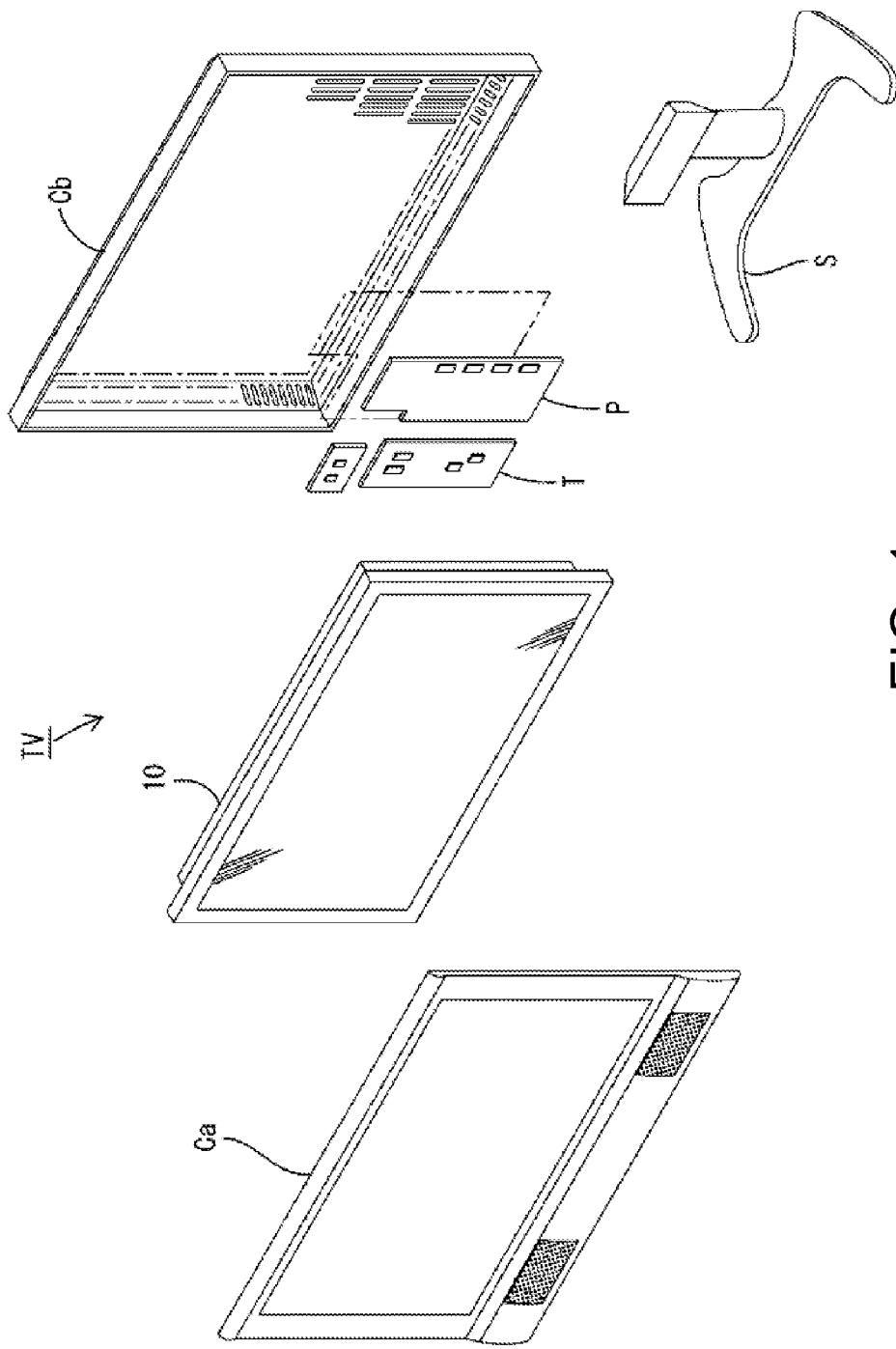
FIG. 1 is an exploded perspective view that shows a schematic configuration of a television receiver according to Embodiment 1 of the present invention.
Figure 2:
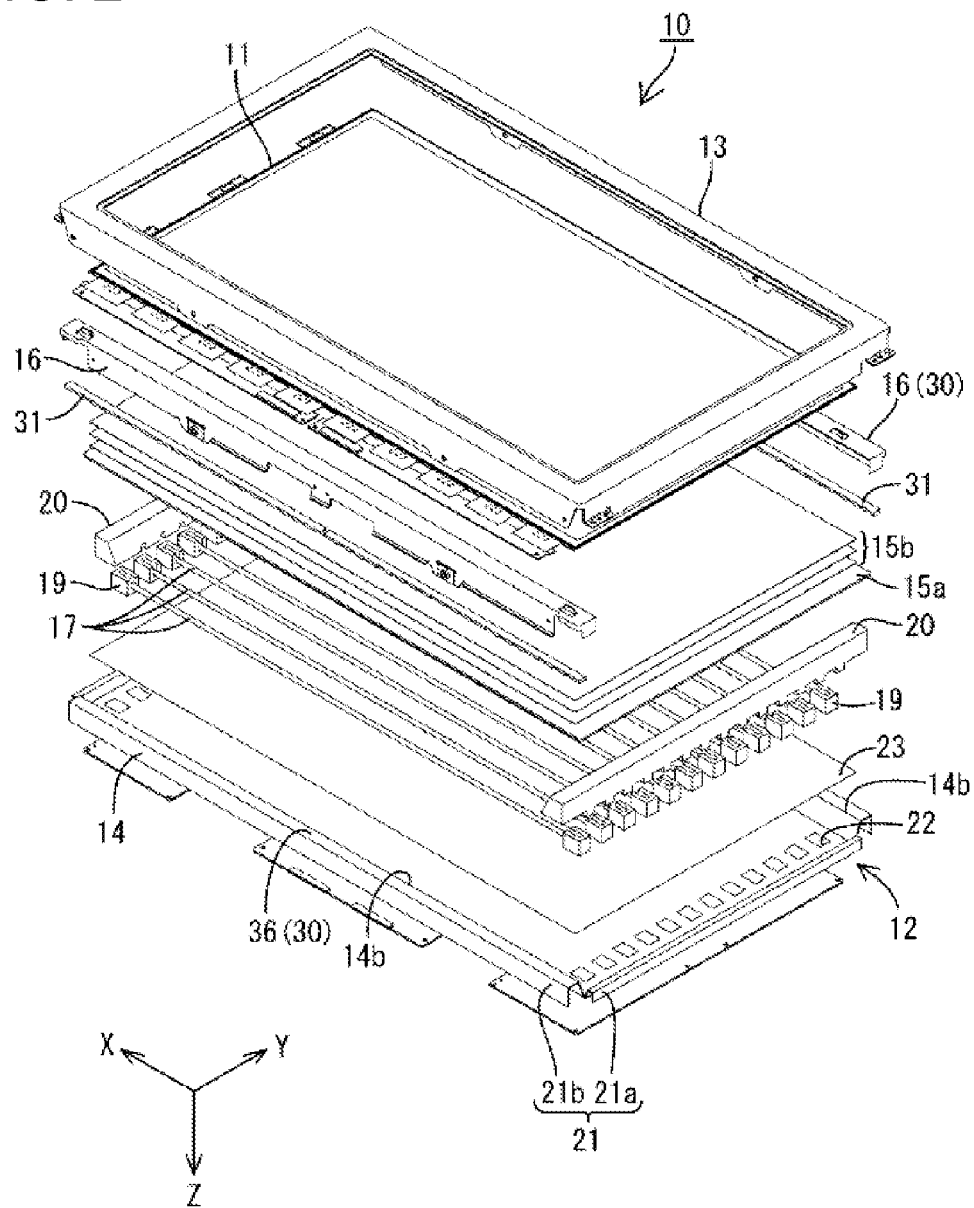
FIG. 2 is an exploded perspective view showing a schematic configuration of a liquid crystal display device.

As shown in FIG. 1, the television receiver TV of the present embodiment includes a liquid crystal display device 10, a front cabinet Ca and a rear cabinet Cb that sandwich the liquid crystal display device 10, a power source P, a tuner T, and a stand S. The liquid crystal display device (display device) 10 is formed in a horizontally long rectangular shape as a whole, and is housed in a vertical orientation. As shown in FIG. 2, the liquid crystal display device 10 includes a liquid crystal panel 11 that is a display panel, and a backlight device (illumination device) 12 that is an external light source, and these are held together as one component by a frame-shaped bezel 13 and the like. The drawings indicate an X axis, a Y axis, and a Z axis in a portion of the drawings, and each of the axes indicates the same direction for the respective drawings. Below, with respect to the Z axis direction, the top side of FIGS. 3 and 4 is the front side, and the bottom side of FIGS. 3 and 4 is the rear side.

Next, the liquid crystal panel 11 and the backlight device 12, which constitute the liquid crystal display device 10, will be described in this order (see FIGS. 2 to 4). The liquid crystal panel (display panel) 11 includes a pair of glass substrates bonded with a prescribed gap therebetween, and liquid crystal sealed between the two glass substrates. One of the glass substrates is provided with switching elements (TFTs, for example) connected to source wiring lines and gate wiring lines orthogonally intersecting each other, pixel electrodes connected to the switching elements, an alignment film, and the like. The other of the glass substrates is provided with color filters made of respective colored portions of R(red), G(green), B(blue), and the like arranged in a prescribed pattern, an opposite electrode, an alignment film, and the like. Polarizing plates 11a and 11b are attached to the outer sides of the respective substrates (refer to FIGS. 3 and 4).

Figure 3:
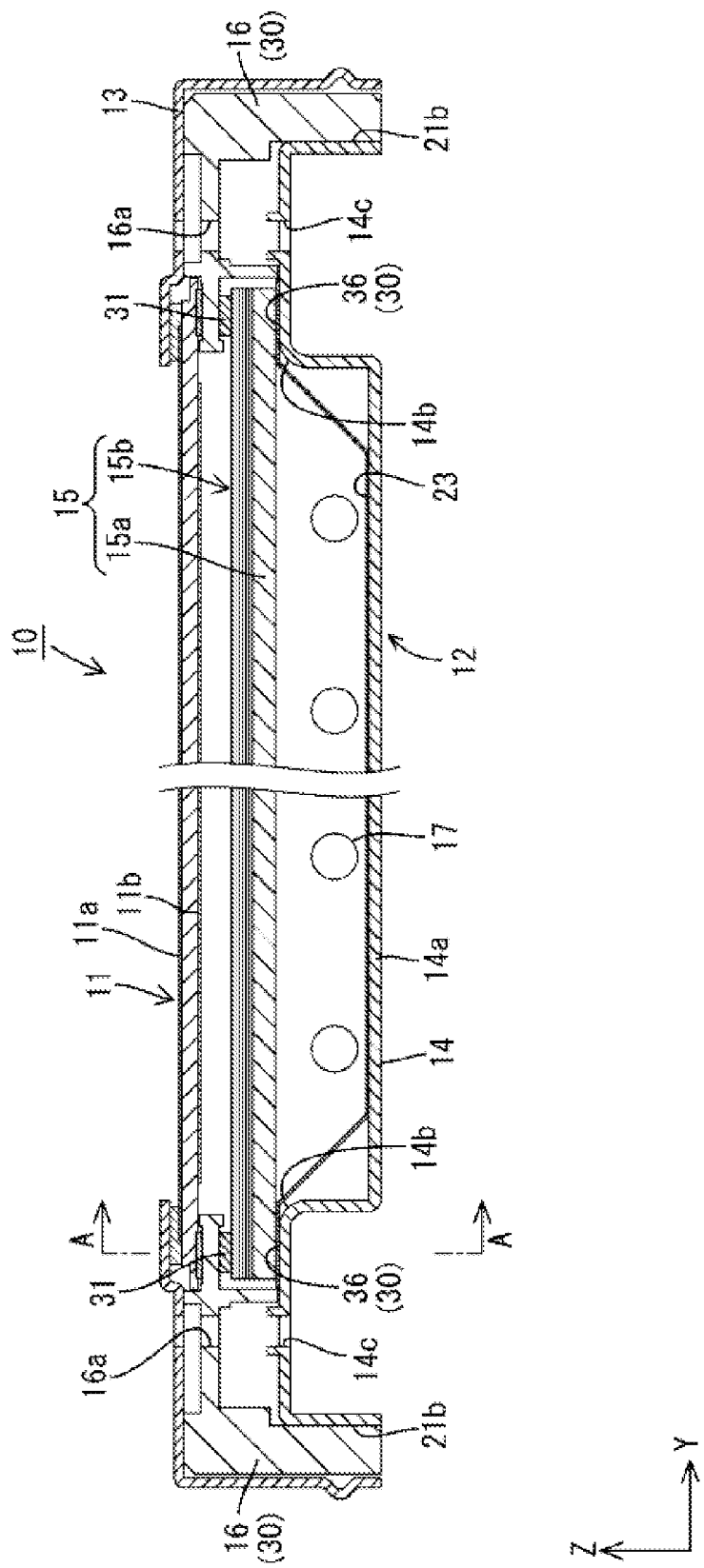
FIG. 3 is a cross-sectional view of the liquid crystal display device along the short side direction.
Figure 4:
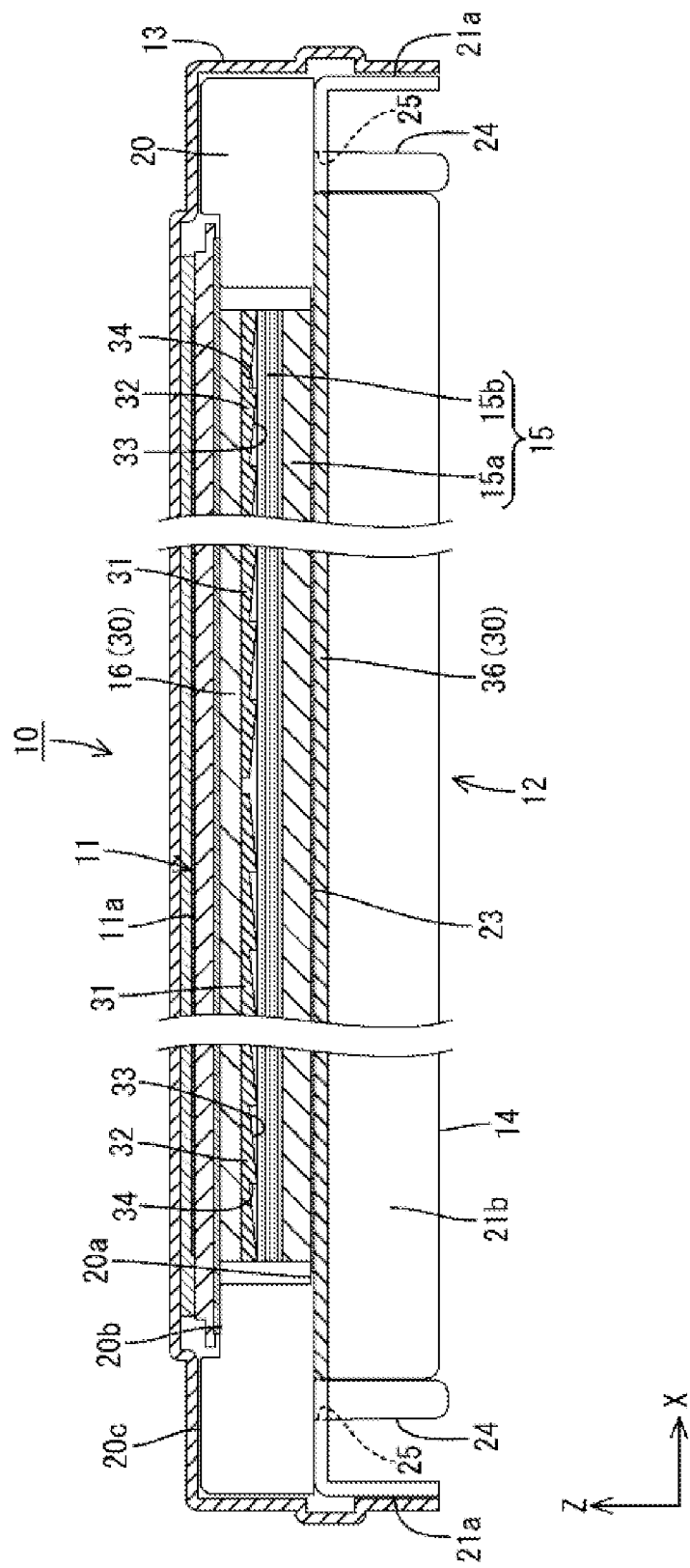
FIG. 4 is a cross-sectional view of the liquid crystal display device along the long side edge, schematically showing a buffer part (cross-sectional view along the line A-A of FIG. 3 that schematically shows a buffer part).

As shown in FIGS. 2 and 3, the backlight device 12 includes a chassis 14 that is in a substantially box shape that opens toward the light-emitting side (front side; liquid crystal panel 11 side), an optical member 15 disposed so as to cover the opening of the chassis 14, and clamping members 30 that clamp the optical member 15. In addition, in the chassis 14, a cold cathode tubes (light source) 17, lamp clips (not shown) for attaching the cold cathode tubes 17 to the chassis 14, relay connectors 19 that serve as a relay for electrical connection at respective ends of the cold cathode tubes 17, and holders 20 that collectively cover respective ends of the cold cathode tubes 17 and the relay connectors 19. In the backlight device 12, the side thereof at which a diffusion plate 15a is disposed, rather than the side at which the cold cathode tubes 17 are disposed, is the light-emitting side.

The chassis 14 is made of a metal, and is formed through plate-metal forming in a shallow substantially box shape made of a bottom plate 14a of a rectangular shape and folded outer edges 21 (folded outer edges 21a of the shorter side direction and folded outer edges 21b of the longer side direction) that rise from the respective sides thereof and that are folded in a substantially U shape. In the bottom plate 14a of the chassis 14, a plurality of attaching holes 22 for attaching the relay connectors 19 are formed at both edges aligned in the longer side direction. On the top surface of each folded outer edge 21b of the chassis 14, a supporting section (first clamping part) 36 that is a part of the clamping member 30 and that supports (holds) the optical member 15 from the side thereof facing the cold cathode tubes 17 is provided. The supporting section 36 is formed by conducting a forming process on an edge of the chassis 14, and moves together with the chassis 14 when the chassis 14 expands or contracts.

The supporting section (first clamping part) 36 is a narrow flat plate part that is positioned outside of each of the aperture edges 14 along the longer side direction of the chassis 14, and the top surface thereof is parallel to the bottom plate 14a of the chassis. The width of the supporting section 36 is set to a width that allows the optical member 15 to be placed thereon while ensuring a clearance, taking into account the expansion and contraction of the chassis 14 and the optical member 15 due to a change in temperature. As shown in FIG. 3, the supporting section 36 has fixing holes 14c formed therein, which allow the bezel 13, the frame 16, the chassis 14, and the like to be held integrally by using screws or the like, for example.

On an inner surface side (side facing the cold cathode tubes 17) of the bottom plate 14a of the chassis 14, a reflective sheet 23 is disposed. The reflective sheet 23 is made of a synthetic resin, and the surface thereof is colored white, which has excellent reflective properties. The reflective sheet 23 is laid to cover the almost entire surface of the bottom plate 14a of the chassis 14 along the inner surface thereof. As shown in FIG. 3, long side edges of the reflective sheet 23 rise to cover the folded outer edges 21b of the chassis 14, and are sandwiched between the chassis 14 and the optical member 15. With the reflective sheet 23, it is possible to reflect light that was emitted from the cold cathode tubes 17 toward the optical member 15.

The cold cathode tubes 17 are a type of line-shaped light source, and as shown in FIG. 2, are stored in the chassis 14 such that the axis line direction matches the long side direction (X axis direction) of the chassis 14. A plurality of the cold cathode tubes 17 are aligned along the short side direction (Y axis direction) of the chassis 14 with a prescribed gap therebetween such that the respective axis lines are substantially parallel to each other. Each gap between adjacent cold cathode tubes 17, or in other words, the alignment pitch, is substantially the same. The cold cathode tubes 17 are disposed such that a small space is provided between the cold cathode tubes 17 and the bottom plate 14a of the chassis 14 (reflective sheet 23), and the respective ends thereof are inserted into the relay connectors 19. The holders 20 are attached to cover these relay connectors 19.

The holders 20 are made of a white synthetic resin, cover the respective ends of the cold cathode tubes 17, and have a narrow substantially box shape that extends along the shorter side direction of the chassis 14. As shown in FIG. 4, the holder 20 has step-shaped surfaces, allowing the diffusion plate 15a and the liquid crystal panel 11 to be placed on different levels, and is disposed partially overlapping a folded outer edge 21a of the short side direction of the chassis 14. The holder 20 forms a side wall of the backlight device 12 together with the folded outer edge 21a. An insertion pin 24 protrudes from a surface of the holder 20 that faces the folded outer edge 21a of the chassis 14, and by inserting the insertion pin 24 into an insertion hole 25 formed in the top surface of the folded outer edge 21a of the chassis 14, the holder 20 is attached to the chassis 14.

The step-shaped surfaces of the holder 20 are constituted of three surfaces that are parallel to the plate surface of the bottom plate 14a of the chassis 14, and on the first surfaces 20a at the lowest position, shorter side edges of the optical member 15 are placed. In addition, from the first surfaces 20a, inclined covers that slope to the inner surface of the bottom plate 14a of the chassis 14 extend. On the second surfaces 20b of the step-shaped surfaces of the holders 20, shorter side edges of the liquid crystal panel 11 are placed. The third surfaces 20c of the step-shaped surfaces of the holders 20, which are at the highest position, are disposed in positions corresponding to the folded outer edges 21a of the chassis 14, and are in contact with the bezel 13.

As shown in FIGS. 2 and 3, two frames (second clamping part) 16 are disposed along the respective longer side edges of the chassis 14, and each frame is made of a metal member that is narrow and formed in an L-shaped in a cross-section view. The frame is disposed such that one side of the L-shape is placed along the supporting section 36, and fastens the optical member 15 from the light-emitting side (upper side), and the other side of the L-shape is placed along the folded outer edge 21b of the chassis 14.

As shown in FIG. 3, the frame 16 has fixing holes 16a formed therethrough in positions corresponding to the fixing holes 14c formed in the supporting section 36. The frame 16 is affixed to the supporting section 36 by screws or the like through these holes, such that the optical member 15 is interposed therebetween. That is, at each long side edge of the aperture edges 14b of the chassis 14, the frame 16 and the supporting section 36 of the chassis 14 are disposed to constitute the clamping part 30, and the clamping part 30 moves together with the chassis 14.

Figure 5:
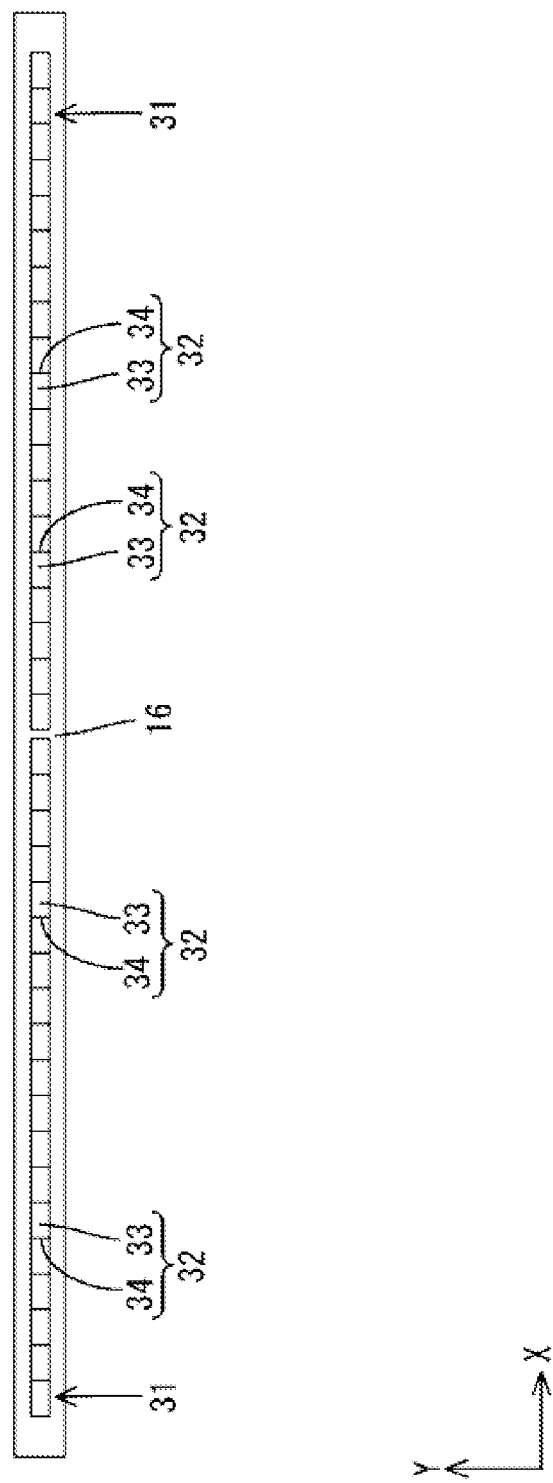
FIG. 5 is a bottom view of a frame, schematically showing a buffer part.

A buffer part 31 is disposed on the one side of the L shape of the frame 16 on a surface thereof facing the optical member 15 in such a manner that the longer side thereof extends along the longer side edge of the optical member 15. As shown in FIGS. 4 and 5, the buffer part 31 is a narrow band-shaped part made of an elastic material such as urethane rubber, silicon rubber, or low expansion ratio foam rubber, thereby making it possible for the clamping member 30 to elastically clamp the optical member 15. In this specification, to "elastically clamp" means to clamp the optical member with a certain pressure while allowing each member to slightly move.

On the side of the buffer part 31 facing the optical member 15, a plurality of mountain-shaped protrusions 32 having a rectangular shape in a plan view and a mountain shape in a cross-sectional view are aligned along the periphery (X axis direction) of the aperture edge 14b of the chassis 14. The top parts thereof are in contact with the optical member 15. In other words, on the side of the buffer part 31 facing the optical member 15, a plurality of mountain-shaped protrusions 32 having a triangle column shape are disposed such that axis lines thereof match the short side direction of the buffer part 31. One frame 16 is provided with two buffer parts 31, and the respective buffer parts are aligned in a line-symmetrical manner with respect to the center of the frame 16 such that the orientations of the respective inclined surfaces of the mountain-shaped protrusions 32 match. Specifically, in FIG. 4, the two buffer parts 31 on the left side and the right side are respectively disposed in the following manner: on the right side of the frame 16 in the figure, the buffer part 31 is placed such that a first inclined surface 34 of each mountain-shaped protrusion 32 is positioned on the right side, and a second inclination surface 33 of each mountain-shaped protrusion 32 is positioned on the left side; and on the left side of the frame 16 in the figure, the buffer part 31 is placed such that the first inclination surface 34 is positioned on the left side, and the second inclination surface 33 is positioned on the right side. The respective buffer parts 31 are bonded to the frame 16 through an adhesive material layer or the like, and move in accordance with the frame 16.

Figure 6:
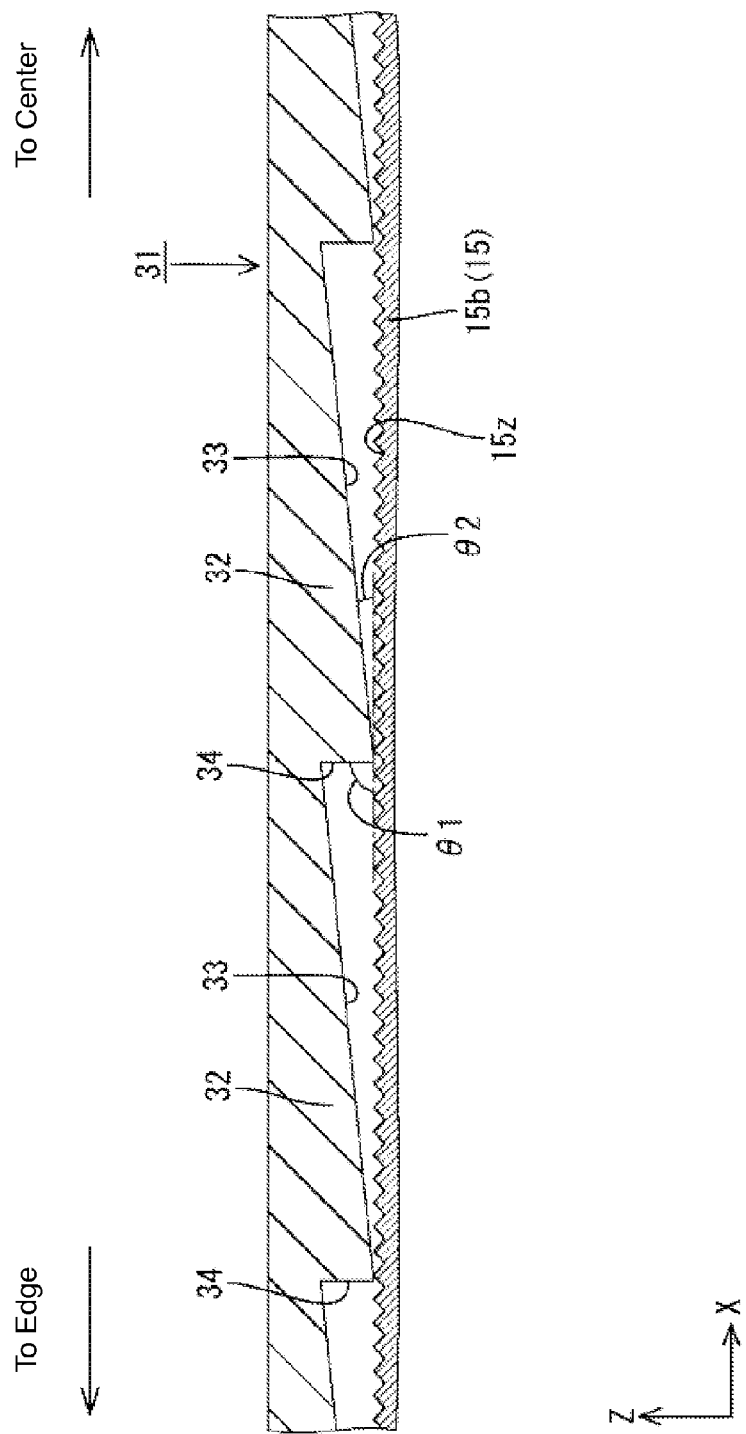
FIG. 6 is an enlarged cross-sectional view that schematically shows portions of a buffer part and an optical member.

As shown in FIG. 6, each mountain-shaped protrusion 32 has the first inclination surface 34 on the side closer to an edge of the chassis 14, and the second inclination surface 33 on the side closer to the center of the chassis 14, and protrudes in a mountain shape with the first inclination surface 34 and the second inclination surface 33 forming a ridge therebetween. The first inclined surface 34 and the second inclined surface 33 are configured such that the first inclined surface 34 rises from the extension surface of the buffer part 31 (surface of the frame 16) in a substantially perpendicular manner (90°), while the second inclined surface 33 rises with a gentle slope (forming an angle smaller than 90°). In other words, the cross-sectional shape of the buffer part 31 along the direction in which the mountain-shaped protrusions 32 are aligned is a so-called saw-tooth shape, and triangles in which the first inclined surface 34 side is shorter than the second inclined surface 33 side are continued to one another. It is preferable that the alignment pitch of the mountain-shaped protrusions 32 be approximately 10 μm to 1 mm, and it is preferable that the protrusion height of the mountain-shaped protrusions 32 be approximately 100 μm to 1 mm. In FIGS. 4 and 5, the buffer part 31 is schematically shown to illustrate the shape of the mountain-shaped protrusions 32, and in the actual situation, the mountain-shaped protrusions 32 are designed to have significantly smaller dimensions than other components.

As shown in FIG. 6, an angle formed by the first inclined surface 34 and the optical member 15 in a direction opposite to the mountain-shaped protrusion 32 is a first inclination angle $\theta 1$, and an angle formed by the second inclined surface 33 and the optical member 15 in a direction opposite to the mountain-shaped protrusion 32 is a second inclination angle $\theta 2$. Because the extension surface of the buffer part 31 (surface of the frame 16) and the optical member 15 are substantially parallel to each other, the angles at which the first inclined surface 34 and the second inclined surface 33 are respectively inclined (inclination angles relative to the reference surface, which is the extension surface) are almost the same as the first inclination angle $\theta 1$ and the second inclination angle $\theta 2$, respectively.

When comparing the first inclination angle $\theta 1$ with the second inclination angle $\theta 2$, the first inclination angle $\theta 1$ is larger than the second inclination angle $\theta 2$. More specifically, the first inclination angle $\theta 1$ is approximately 90°, which is the same as the inclination angle of the first inclined surface 34, while the second inclination angle $\theta 2$ is an angle smaller than 90°, which is the same as the inclination angle of the second inclined surface 33.

On the other hand, the optical member 15 has a diffusion plate 15a and optical sheets 15b disposed on the diffusion plate 15a, and is made of a plurality of layers of rectangular members. As shown in FIG. 4, each longer side edge of the optical member 15 is held in place by being sandwiched by the supporting section 36 of the chassis 14 and the frame 16 (clamping member 30). The shorter side edges of the optical member 15 are disposed on the first surfaces 20a of the holders 20 as described above, and are not restrained in the up and down direction. The top surface of the optical member 15 means a top surface of the uppermost member among the plurality of layered members.

The diffusion plate 15a is made by dispersing light diffusing particles in the synthetic resin plate-shaped member, and has the function of diffusing substantially linear light emitted from the cold cathode tubes 17, which are line-shaped light sources. The optical sheets 15b disposed on the diffusion plate 15a include a diffusion sheet, a lens sheet, and a reflective polarizing plate layered in that order from the diffusion plate 15a. The optical sheets 15b have the function of converting light emitted from the cold cathode tubes 17 and passing through the diffusion plate 15a into planar light. In the present embodiment, recesses 15z are formed on the top surface of the optical sheets 15b so as to catch the mountain-shaped protrusions 32 described above. The recesses 15z are not formed by conducting a special recess forming process on the optical sheets 15b, but rather, the recesses 15z are concave parts of the surface of the optical sheets 15b having very small surface protrusions and recesses that are formed during the manufacturing process of the optical sheets 15b, i.e., surface roughness.

As described above, the optical member 15 is held by the clamping member 30, and specifically, is held by fastening the supporting sections (first clamping parts) 36 of the chassis 14 and the frames (second clamping parts) 16 to each other by screws or the like, for example. The buffer parts 31 are disposed between the optical member 15 and the frames 16, and the optical member 15 is elastically fastened by the clamping members 30.

Next, effects of the present embodiment will be explained. In the present embodiment, because the first inclination angle θ1 is larger than the second inclination angle θ2 in the mountain-shaped protrusions 32, the first inclined surfaces 34 of the mountain-shaped protrusions 32 are more likely to be caught by the top surface of the optical member 15 as compared with the second inclined surfaces 33, and therefore, it is possible to prevent the optical member 15 from warping or having wrinkles due to a change in temperature.

The specific operation will be explained with reference to FIG. 6. When the chassis 14 undergoes thermal expansion due to the backlight device 12 being turned on, the buffer part 31 disposed on the frame 16 that moves in accordance with the chassis 14 moves toward an edge of the chassis 14 (left side of FIG. 6). Because the first inclined surfaces 34 of the mountain-shaped protrusions 32 rise in a substantially perpendicular manner with respect to the direction in which the recesses 15z are depressed, the first inclined surfaces 34 are more likely to be caught by the recesses 15z on the top surface of the optical member 15, which makes it easier for the optical member 15 to be pulled toward the left side (expansion direction). On the other hand, when the chassis 14 is cooled down and contracts after the backlight device 12 is turned off, the buffer part 31 disposed on the frame 16 that moves in accordance with the chassis 14 moves toward the center of the chassis 14 (right side of FIG. 6). Because the second inclined surfaces 33 of the mountain-shaped protrusions 32 are gently-inclined with respect to the direction in which the recesses 15z are depressed, the second inclined surfaces 33 are less likely to be caught by the recesses 15z on the top surface of the optical member 15, which makes it harder for the optical member 15 to be pulled toward the right side (contraction direction). Therefore, when the chassis 14 expands and contracts due to the backlight device 12 being turned on and off, the optical member 15 is more likely to be pulled toward an edge of the chassis 14 (left side of FIG. 6), or in other words, the optical member 15 is more likely to be pulled in a direction in which the optical member 15 expands, thus making it harder for warping or wrinkles to occur.

In the present embodiment, the first clamping part fastening the optical member 15 is the supporting section 36 that is a portion of the chassis 14 outside of the aperture edge 14b and that is provided to support the optical member 15, and the second clamping part fastening the optical member 15 is the frame 16 that extends along the supporting section 36 and that is affixed to the supporting section 36. Thus, the clamping member 30 can be obtained simply by affixing the frames 16 to the supporting sections 36, and therefore, it is possible to clamp the optical member 15 with a simple configuration.

Embodiment 2

Embodiment 2 of the present invention will be described with reference to FIGS. 7 to 9. Embodiment 2 differs from Embodiment 1 above in the arrangement of a frame 116 and buffer parts 131. Embodiment 2 also differs from Embodiment 1 in the configuration of mountain-shaped protrusions 132 in particular, which specifically is the orientation of the inclined surfaces. Descriptions of structures, operations, and effects similar to those of Embodiment 1 will be omitted.

Figure 7:
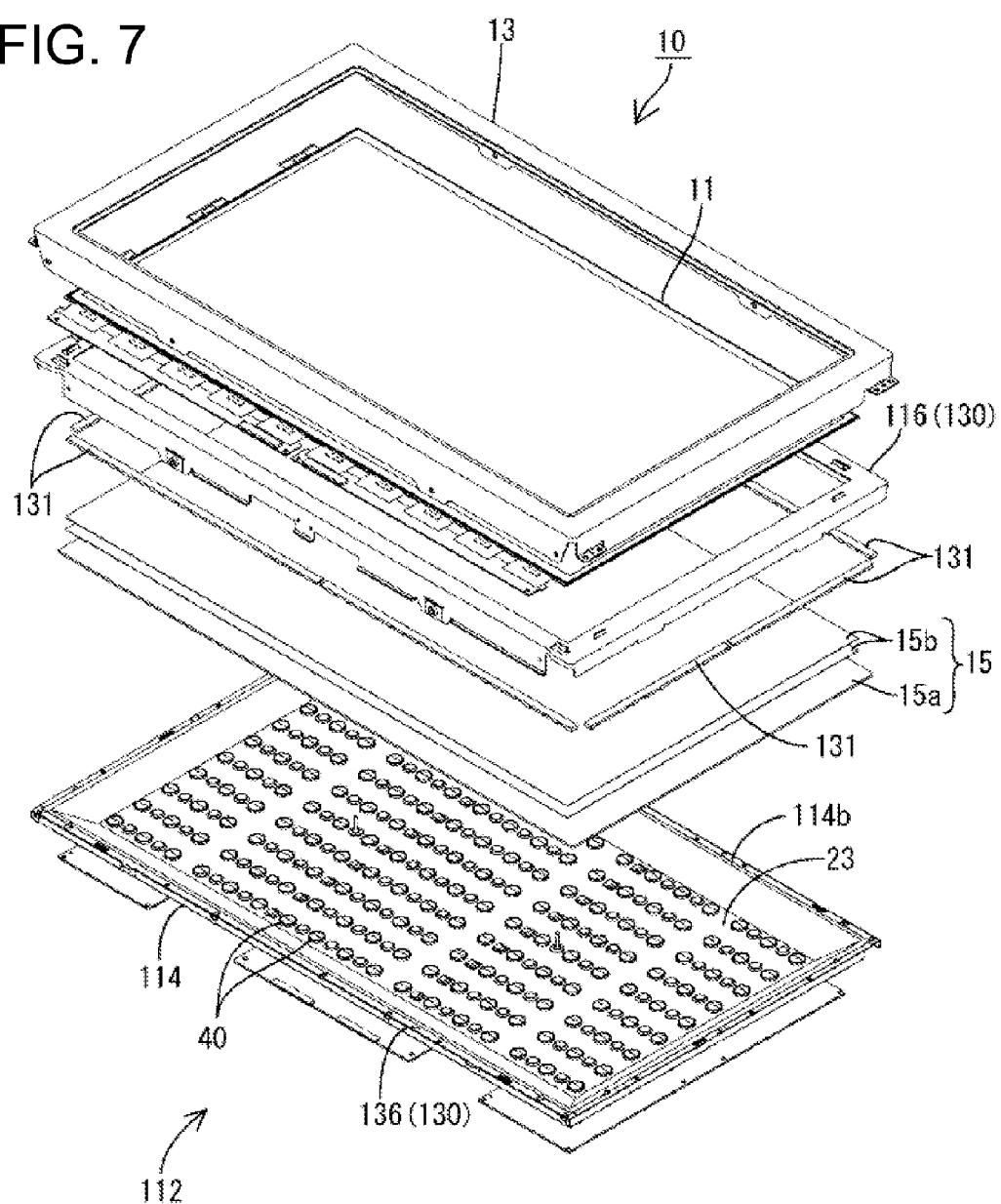
FIG. 7 is an exploded perspective view schematically showing a liquid crystal display device according to Embodiment 2 of the present invention.

As shown in FIG. 7, a backlight device 112 includes a chassis 114 that is in a substantially box shape having an aperture 114b on the light-emitting side (side facing the liquid crystal panel 11), an optical member 15 disposed to cover the aperture of the chassis 114, and a clamping member 130 that clamps the optical member 15. In addition, LEDs 40 (light-emitting diodes) as light sources, and a reflective sheet 23 that reflects light inside of the chassis 114 toward the optical member 15 are also provided in the chassis 114. In the backlight device 112, the side at which the optical member 15 is disposed, rather than the side at which the LEDs 40 are disposed, is the light-emitting side.

The chassis 114 is made of a metal, and has a bottom plate 114a that is in a horizontally long rectangular shape in a manner similar to the liquid crystal panel 11, side plates 114c that rise from the outer edges of the respective sides of the bottom plate 114a (a pair of long sides and a pair of short sides) toward the front side (light-emitting side), and supporting section 136 that protrudes outwardly from the edges of the respective side plates 114c and that supports the optical member 15. As a whole, the chassis 114 is formed in a substantially shallow box shape (substantially shallow dish shape) that opens toward the front side.

The supporting section (first clamping part) 136 is a frame-shaped portion that is positioned outside of aperture edges 114b of the chassis 114 along the entire periphery of the aperture edges 114b, and is disposed such that the top surface thereof is parallel to the bottom plate 114a of the chassis. The width of the supporting section 136 is set to a width that allows the optical member 15 to be placed thereon while ensuring a clearance, taking into account the expansion and contraction of the chassis 114 and the optical member 15 due to a change in temperature. The supporting section 136 has fixing holes formed therein, thereby allowing the bezel 13, the frame 116, the chassis 114, and the like to be integrally held by using screws or the like, for example.

The reflective sheet 23 is laid on the inner surface of the bottom plate 114a of the chassis 114. The reflective sheet 23 is made of a synthetic resin, and the surface thereof is colored white, which has excellent reflective properties. The reflective sheet 23 is laid to cover the almost entire surface of the bottom plate 114a of the chassis 114 along the inner surface thereof. The edges of the reflective sheet 23 rise to cover the side plates 114c of the chassis 114, and are sandwiched between the chassis 114 and the optical member 15. With the reflective sheet 23, it is possible to reflect light emitted from the LEDs 40 toward the optical member 15.

Figure 8:
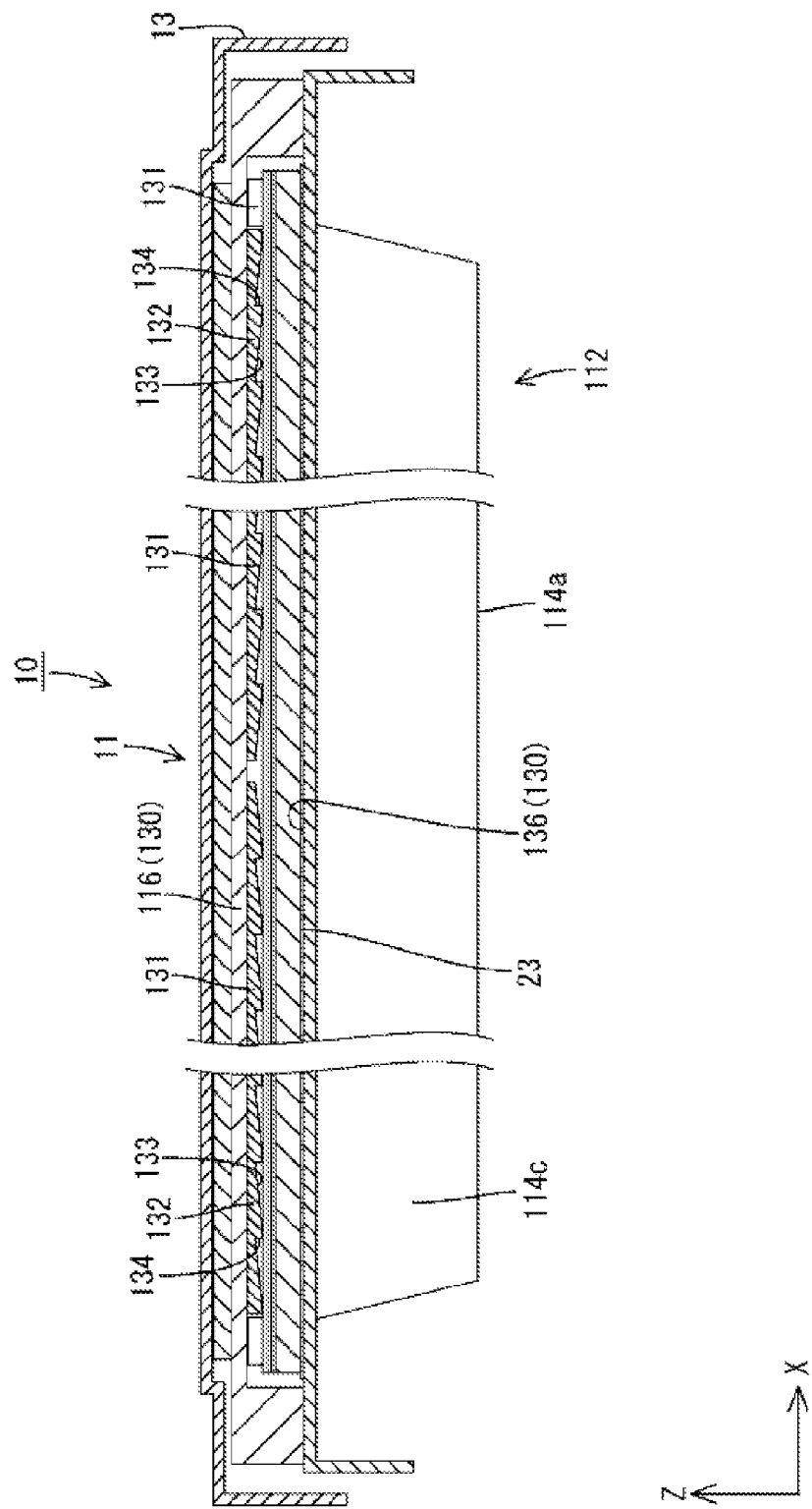
FIG. 8 is a cross-sectional view of the liquid crystal display device along the long side edge, schematically showing a buffer part.

As shown in FIGS. 7 and 8, the frame (second clamping part) 116 is a rectangular frame-shaped member made of a metal with each side having an L-shape cross section, and is disposed along the aperture edges 114b of the chassis 114. One side of the L shape is placed along the supporting section 136, thereby holding the optical member 15 from the light-emitting side (top side).

The frame 116 has fixing holes (not shown) formed therethrough in positions matching the fixing holes (not shown) formed in the supporting section 136. The frame 116 is affixed to the supporting section 136 by screws or the like through these holes, with the optical member 15 interposed therebetween. In other words, along the entire periphery of the aperture edges 114b of the chassis 114, the frame 116 and the supporting sections 136 of the chassis 114 constitute the clamping member 130, and the clamping member 130 moves in accordance with the chassis 114.

Of the one side of the L shape of the frame 116, a surface facing the optical member 15 has buffer parts 131 disposed thereon such that the longer side direction thereof extends along the outer edges of the optical member 15. The buffer parts 131 are disposed along the entire frame 116, or in other words, along the entire periphery of the aperture edges 114b.

On the side of each buffer part 131 facing the optical member 15, a plurality of mountain-shaped protrusions 132 having a rectangular shape in a plan view and a mountain shape in a cross-sectional view are aligned along the circumference direction (X axis direction and Y axis direction) of the aperture edges 114b of the chassis 114. The top parts thereof are in contact with the optical member 15. In other words, on the side of the buffer part 131 facing the optical member 15, a plurality of mountain-shaped protrusions 132 in a triangular column shape are provided such that the axis lines thereof are inclined at a prescribed angle with respect to the short side direction of the buffer part 131. Each side of the rectangular frame-shaped frame 116 is provided with two buffer parts 131, and the respective buffer parts are aligned in a line-symmetrical manner with respect to the center of the frame 116 such that the inclination direction of the mountain-shaped protrusions 132 matches.

Figure 9:
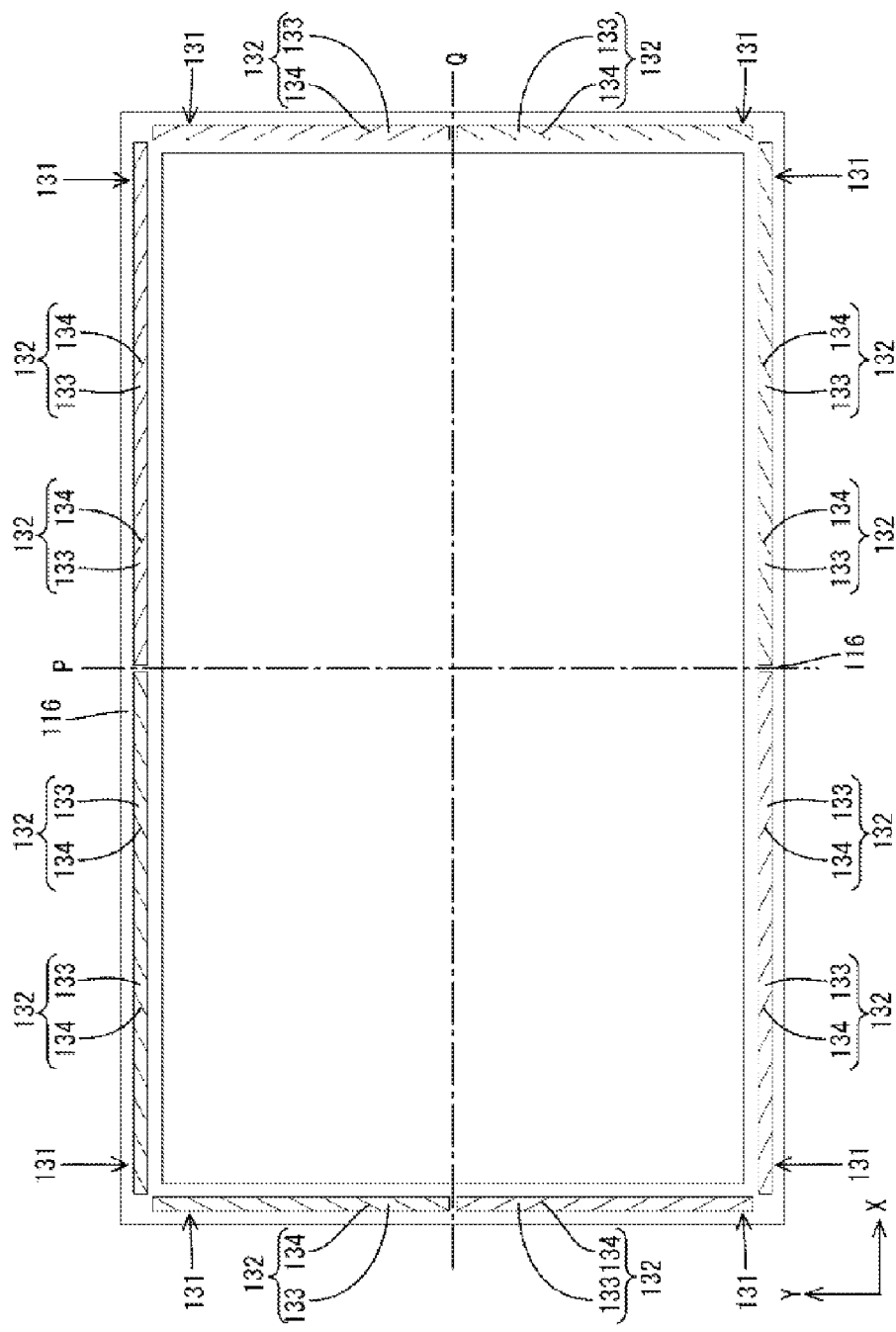
FIG. 9 is a bottom view of a frame, schematically showing a buffer part.

As shown in FIG. 9, the mountain-shaped protrusions 132 are aligned such that the second inclined surfaces 133 are inclined toward the center of the chassis 114, and the first inclined surfaces 134 are inclined toward the outside of the chassis 114. In other words, each mountain-shaped protrusion 132 is formed in a triangular column shape with the first inclined surface 134 and the second inclined surface 133 being side faces thereof, and is disposed such that the axis line of the triangular column is oriented in the direction away from the center of the chassis 114, from the outside to the inside of the chassis 114.

Specifically, in FIG. 9, in a plan view of the frame 116, when the frame 116 is divided by lines P and Q that respectively extend along the X axis direction and Y axis direction passing through the center of the chassis 114 (frame 116), in the upper left portion and the lower right portion, the mountain-shaped protrusions 132 are disposed such that the axis lines thereof extend toward the top right (toward the bottom left), and in the upper right portion and the lower left portion, the mountain-shaped protrusions 132 are disposed such that the axis lines thereof extend toward the bottom right (toward the top left). The inclination angles of first inclined surfaces 134 and second inclined surfaces 133 with respect to the extension surface of the buffer part 131 are the same as those in Embodiment 1. In a manner similar to Embodiment 1, when comparing the first inclination angle θ1 with the second inclination angle θ2, the first inclination angle θ1 is larger than the second inclination angle θ2.

In the present embodiment, the mountain-shaped protrusions 132 that move in accordance with a deformation of the chassis 114 are most likely to be caught by the optical member 15 when they are moving toward the outside of the chassis 114. Also, because the mountain-shaped protrusions 132 are disposed along the entire periphery of the aperture edges 114b of the chassis 114, the mountain-shaped protrusions 132 are caught by the optical member 15 along the entire circumference of the chassis 114. Therefore, when the chassis 114 expands and contracts, the optical member 15 is more likely to be pulled radially in the direction from the center toward the outside of the chassis at the entire periphery of the aperture edges 114b of the chassis 114, and it is possible to prevent warping or wrinkles even more reliably in the area near the center of the chassis 114 where the optical member 15 is especially susceptible to warping and wrinkles.

Embodiment 3

Figure 10:
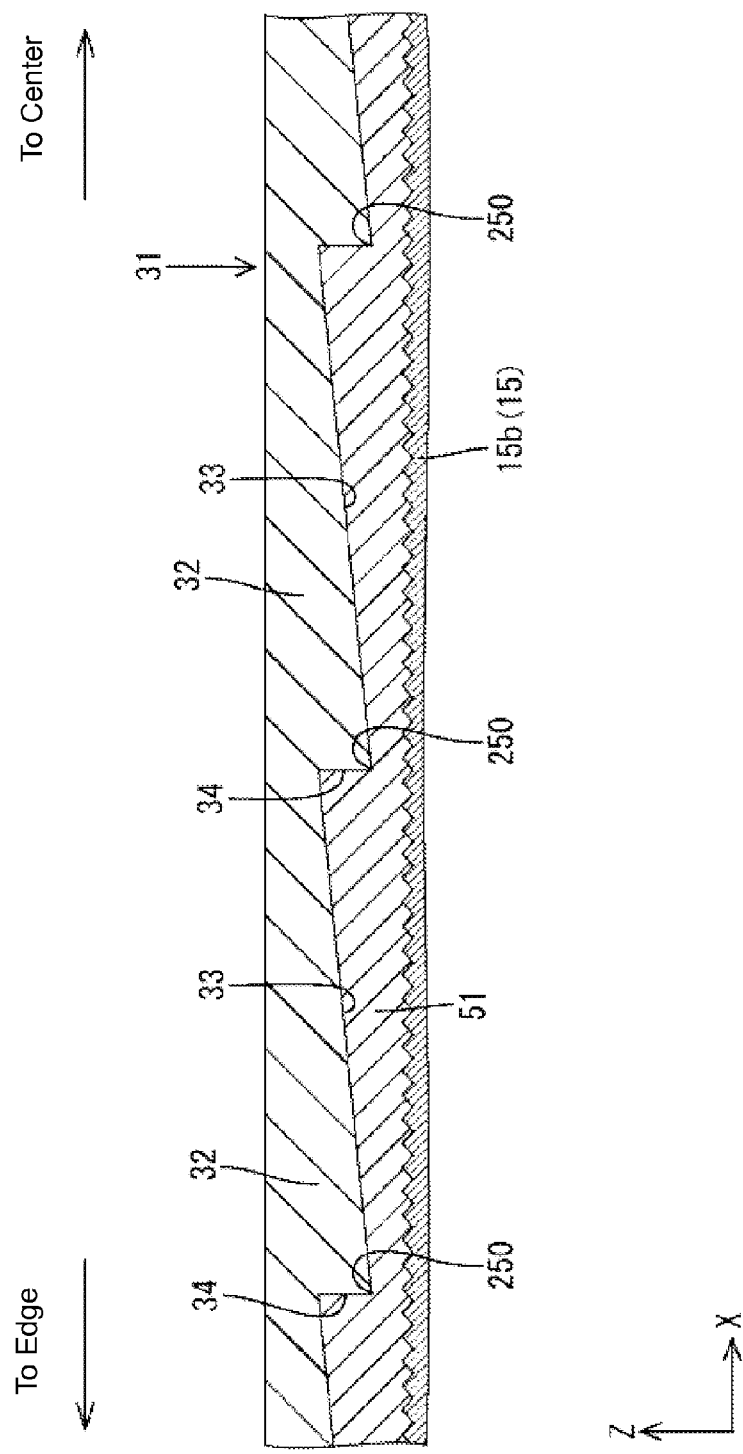
FIG. 10 is an enlarged cross-sectional view schematically showing portions of a buffer part and an optical member of Embodiment 3 of the present invention.

Embodiment 3 of the present invention will be described with reference to FIG. 10. Embodiment 3 differs from Embodiment 1 above in that recesses 250 are formed by bonding a seal member 51 having recesses and protrusions to the optical member 15. Descriptions of structures, operations, and effects similar to those of Embodiment 1 will be omitted.

In a portion of the optical member 15 facing each buffer part 31, a seal member 51 with recesses and protrusions is bonded, thereby forming recesses 250 for catching the top part of the mountain-shaped protrusions 32. On the top surface of the seal member 51 with recesses and protrusions, the recesses 250 are formed in a corresponding shape to the mountain-shaped protrusions 32, and on the bottom surface thereof, a not-shown adhesive layer is provided. In other words, the cross-sectional shape of the seal member 51 with recesses and protrusions along the direction in which the recesses 250 are aligned is a so-called saw-tooth shape having the same pitch and the same shape as the cross-sectional shape of the mountain-shaped protrusions 32, and the top parts of the mountain-shaped protrusions 32 engage the recesses 250 of the seal member 51 with recesses and protrusions. The seal member 51 with recesses and protrusions is bonded to the surface of the optical member 15 through the adhesive layer, and therefore, a force acting on the seal member 51 with recesses and protrusions acts on the optical member 15 through the seal member 51 with recesses and protrusions.

In the present embodiment, because the optical member 15 has the recesses 250 formed thereon for catching the top parts of the mountain-shaped protrusions 32, the first inclined surfaces 34 of the mountain-shaped protrusions 32 are caught by the recesses 250 provided on the optical member 15 with greater ease, and therefore, it is possible to prevent the optical member 15 from warping or having wrinkles even more reliably. The recesses 250 are provided by bonding the seal member 51 with recesses and protrusions to the top surface of the optical member 15, and therefore, it is possible to form the recesses 250 with ease.

Embodiment 4

Figure 11:
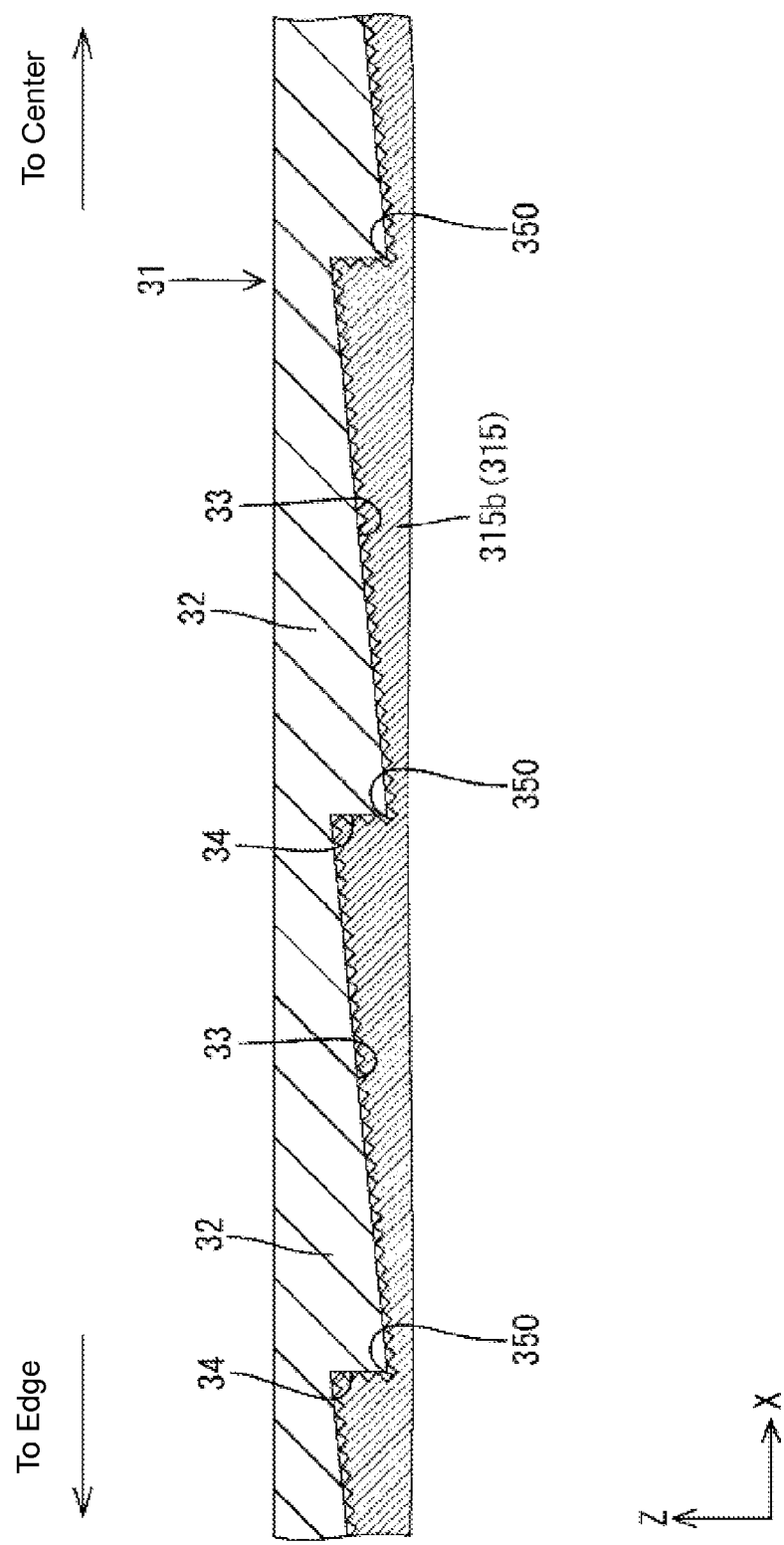
FIG. 11 is an enlarged cross-sectional view schematically showing portions of a buffer part and an optical member of Embodiment 4 of the present invention.

Embodiment 4 of the present invention will be described with reference to FIG. 11. Embodiment 4 differs from Embodiment 1 above in that recesses 350 are formed integrally with an optical member 315. Descriptions of structures, operations, and effects similar to those of Embodiment 1 will be omitted.

Of the optical member 315, an optical sheet 315b that faces buffer parts 31 has recesses 350 formed on the top surface thereof. The recesses 350 are formed integrally with the optical sheet 315b, and catch the top parts of the mountain-shaped protrusions 32. The cross-sectional shape of the recesses 350 along the direction in which the recesses 350 are aligned is a so-called saw-tooth shape having the same pitch and the same shape as the cross-sectional shape of the mountain-shaped protrusions 32, and the top parts of the mountain-shaped protrusions 32 engage the recesses 350 of the optical member 315.

In the present embodiment, because the optical member 315 has the recesses 350 formed thereon for catching the top parts of the mountain-shaped protrusions 32, the first inclined surfaces 34 of the mountain-shaped protrusions 32 are caught by the recesses 350 provided on the optical member 315 with greater ease, and therefore, it is possible to prevent the optical member 315 from warping or having wrinkles even more reliably. The recesses 350 are integrally formed with the optical member 315, and because it is not necessary to prepare a member having recesses separately from the optical member 315, it is possible to reduce the number of components.

Embodiment 5

Figure 12:
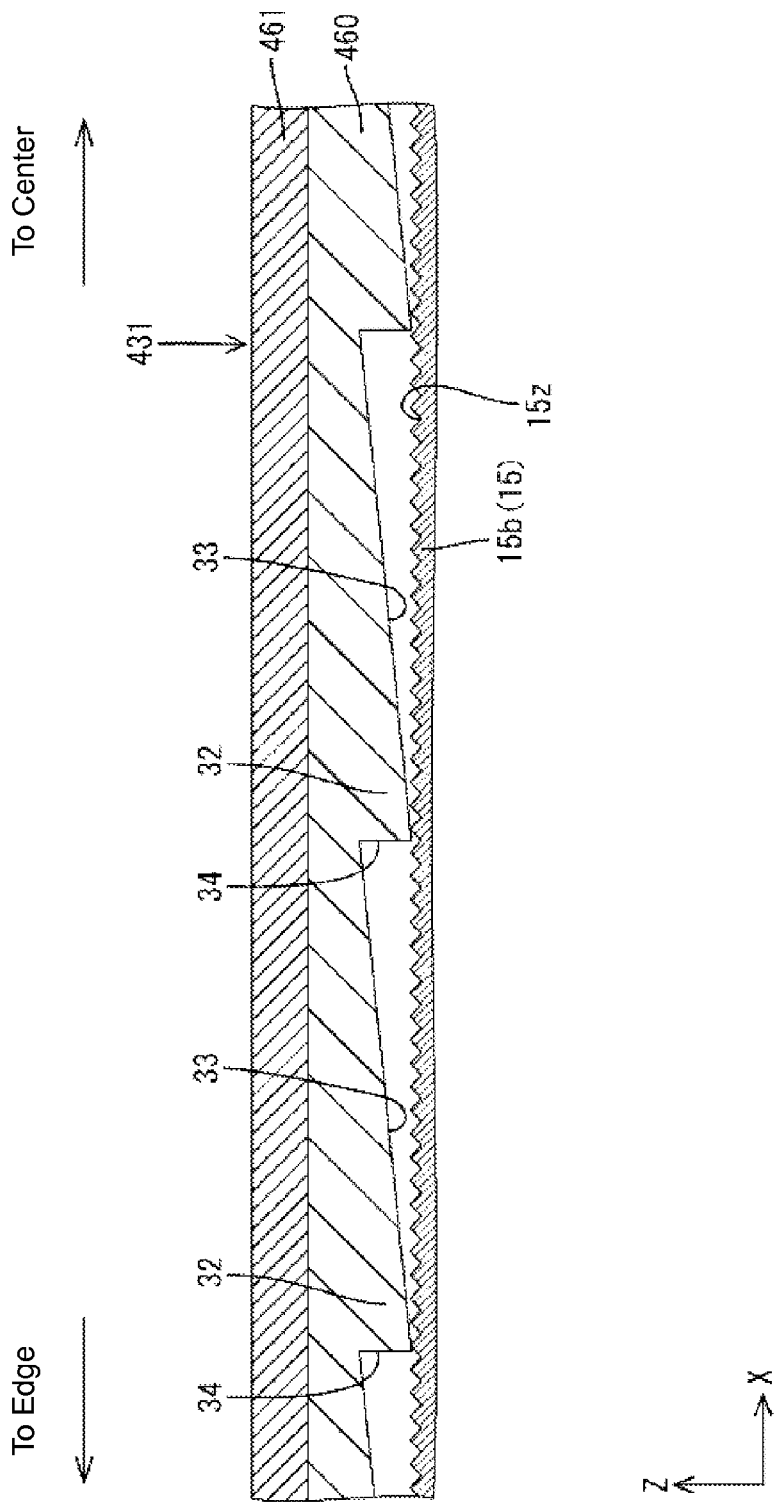
FIG. 12 is an enlarged cross-sectional view schematically showing portions of a buffer part and an optical member of Embodiment 5 of the present invention.

Embodiment 5 of the present invention will be described with reference to FIG. 12. Embodiment 5 differs from Embodiment 1 above in that a buffer part 431 is made of a first layer 460 and a second layer 461. Descriptions of structures, operations, and effects similar to those of Embodiment 1 will be omitted.

The buffer part 431 is made of the first layer 460 positioned closer to the optical member 15, and the second layer 461 positioned closer to the frame 16. The first layer 460 of the buffer part 431 is made of an elastic material such as urethane rubber, silicon rubber, or a low expansion ratio foam rubber, thereby allowing the clamping member 30 to elastically clamp the optical member 15. The second layer 461 of the buffer part 431 is made of so-called plastic or the like such as PET, polycarbonate, or an acrylic resin, and is made of a material harder than that of the first layer 460.

In the present embodiment, because the rigidity of the buffer part 431 can be improved while ensuring the elasticity of a portion of the buffer part 431 making contact with the optical member 15, it is possible to prevent a pressing force of the buffer part 431 acting on the optical member 15 from being reduced as a result of a deformation of the buffer part 431. As a result, a reduction in force that pulls the optical member 15 from the center of the backlight device 12 toward an edge thereof can be mitigated, thereby preventing the optical member 15 from warping or having wrinkles even more reliably.

Embodiment 6

Figure 13:
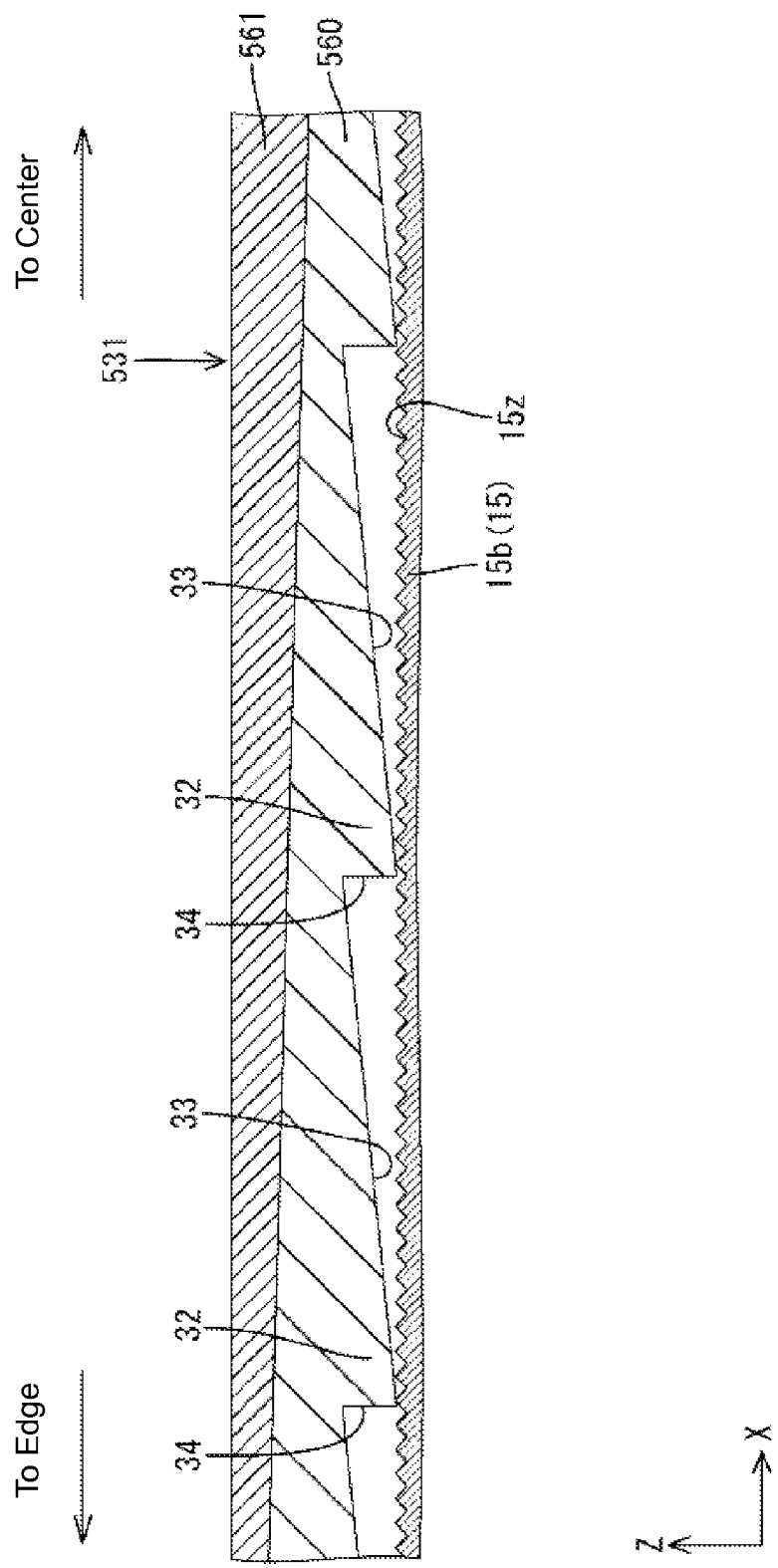
FIG. 13 is an enlarged cross-sectional view schematically showing portions of a buffer part and an optical member of Embodiment 6 of the present invention.

Embodiment 6 of the present invention will be described with reference to FIG. 13. Embodiment 6 differs from Embodiment 1 above in that the configurations of the first layer 460 and the second layer 461 of Embodiment 5 above are further limited. Descriptions of structures, operations, and effects similar to those of Embodiment 1 will be omitted.

A buffer part 531 is made of a first layer 560 positioned closer to the optical member 15, and a second layer 561 positioned closer to the frame 16. The second layer 561 of the buffer part 531 is configured to be thicker in a portion thereof positioned closer to the center of the chassis 14 than a portion thereof positioned closer to an edge of the chassis 14.

In the present embodiment, the rigidity of the buffer part 531 can be improved more in the center section than in the edge section of the chassis 14, and therefore, it is possible to prevent the optical member 15 from warping or having wrinkles in the center portion of the chassis 14 where the optical member 15 is especially susceptible to the warping or wrinkles.

Embodiment 7

Figure 14:
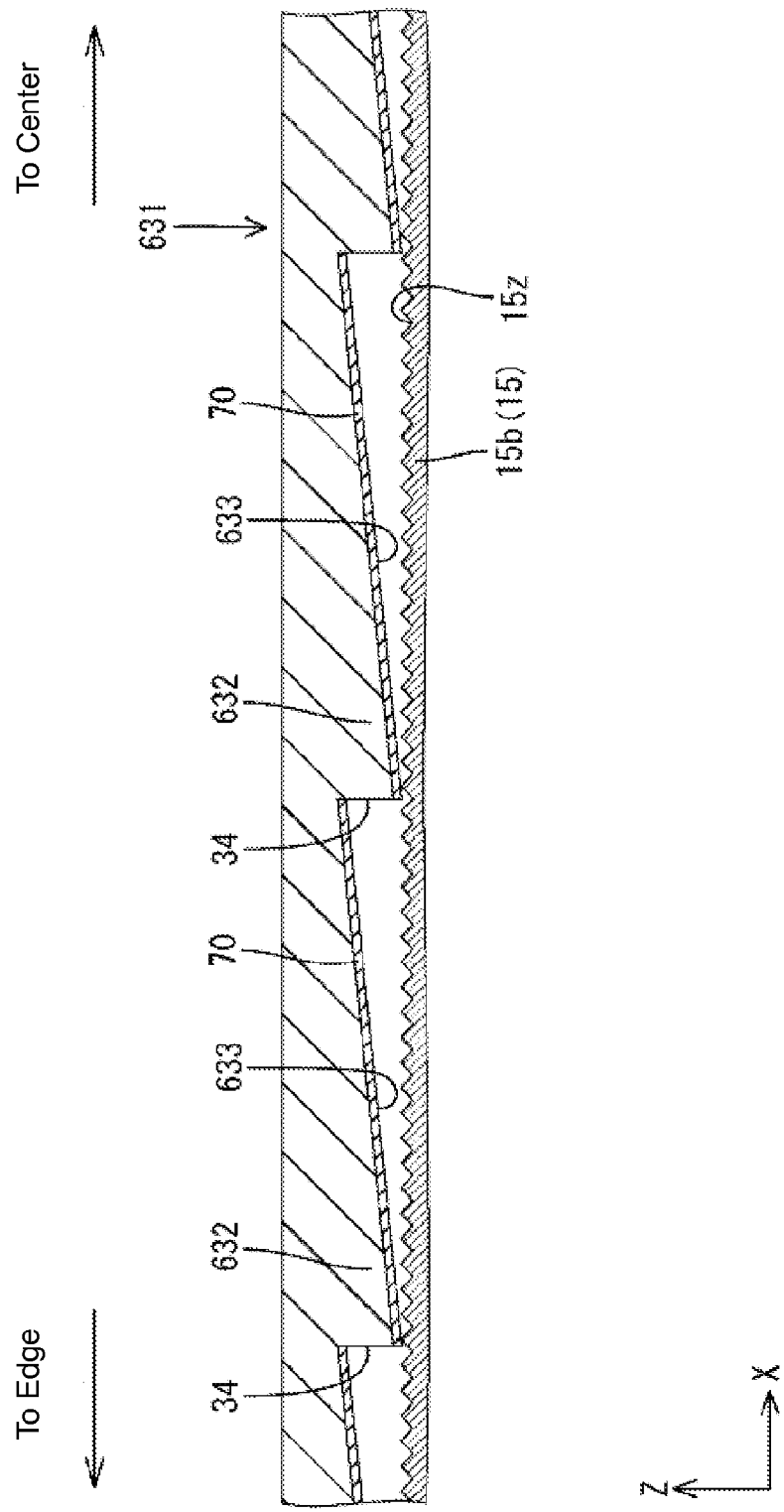
FIG. 14 is an enlarged cross-sectional view schematically showing portions of a buffer part and an optical member of Embodiment 7 of the present invention.

Embodiment 7 of the present invention will be described with reference to FIG. 14. Embodiment 7 differs from Embodiment 1 above in that a low friction layer 70 having a small friction coefficient is formed on each second inclined surface 633 of a buffer part 631. Descriptions of structures, operations, and effects similar to those of Embodiment 1 will be omitted.

On the surface of the second inclined surface 633 of each mountain-shaped protrusion 632, a low friction layer 70 is formed. The low friction layer 70 is made of a material such as PET, polycarbonate, an acrylic resin, a vinyl resin, or chemical fiber having a lower friction coefficient than the elastic material that forms the buffer part 631 such as urethane rubber, silicon rubber, or low expansion ratio form rubber. The low friction layer 70 may be attached to the surface of the second inclined surface 633 through an adhesive layer or the like, or may be integrally formed with the buffer part 631.

In the present embodiment, it becomes even harder for the second inclined surfaces 633 to be caught by the optical member 15, and therefore, the warping or wrinkles in the optical member 15 can be prevented even more reliably.

Other Embodiments

The present invention is not limited to the embodiments shown in the drawings and described above, and the following embodiments are also included in the technical scope of the present invention, for example.

(1) In the embodiments above, the clamping member 30 was disposed at each longer side edge of the aperture edges 14b of the chassis 14, or was disposed along the entire periphery of the aperture edges 114b of the chassis 114, but the clamping member 30 may be disposed at each shorter side edge of the aperture edges of the chassis, or may be disposed in a portion of the aperture edges.

(2) In the embodiments above, the buffer part 31 was provided to the frame (second clamping part) 16, but the buffer part may be provided to the supporting section (first clamping part) 36, or may be provided to each of the frame (second clamping part) 16 and the supporting section (first clamping part) 36.

(3) In the embodiments above, the buffer part 31 was provided separately from the frame (second clamping part) 16, and was attached thereto through an adhesive layer, but the buffer part 31 may be formed integrally with the frame (second clamping part) or the like.

(4) In the embodiments above, a configuration in which the clamping part 30 was made of the supporting section (first clamping part) 36 formed integrally with the chassis 14, and the frame (second clamping part) 16 provided separately from the chassis 14 was described as an example, but the present invention is not limited thereto. It is also possible that the clamping member includes a first clamping part provided separately from the chassis and attached to the chassis, for example.

(5) In the embodiments above, the inclination angles of the first inclined surface 34 and the second inclined surface 33 were approximately 90° and an angle smaller than 90°, respectively, but the inclination angles are not limited thereto as long as the first inclination angle θ1 is larger than the second inclination angle θ2.

(6) In the embodiments above, the recesses 250 and the recesses 350 had the same pitch and the same shape as the mountain-shaped protrusions 32 of the buffer part 31, but the present invention is not limited thereto. For example, the recesses may be provided with a pitch that is the integral multiple such as double of the pitch of the mountain-shaped protrusions 32. It is also possible to provide the recesses having a different shape from the mountain-shaped protrusions 32 in a random manner by simply conducting a surface roughing process on the surface of the seal member 51 with recesses and protrusions or on the surface of the optical member 15.

(7) In the embodiments above, TFTs were used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(8) In the embodiments above, a liquid crystal display device using a liquid crystal panel as a display panel was described as an example, but the present invention is applicable to a display device that uses another type of display panel.

(9) In the embodiments above, a television receiver that includes a tuner was described as an example, but the present invention is also applicable to a display device without a tuner.

DESCRIPTION OF REFERENCE CHARACTERS 10 liquid crystal display device (display device)
11 liquid crystal panel (display panel)
12, 112 backlight device (illumination device)
14, 114 chassis
14b, 114b aperture edge
15, 315 optical member
15z recess
16, 116 frame (second clamping part)
17 cold cathode tube (light source)
30, 130 clamping member
31, 431, 631 buffer part
32, 132, 632 mountain-shaped protrusion
33, 133, 633 second inclined surface
34, 134 first inclined surface
36, 136 supporting section (first clamping part)
40 LED (light source)
250, 350 recess
51 seal member with recesses and protrusions
460, 560 first layer
461, 561 second layer
70 low friction layer
TV television receiver
θ1 first inclination angle
θ2 second inclination angle

The invention claimed is:

1. An illumination device, comprising:
a chassis that has an aperture on a light-emitting side;
a light source that is stored in the chassis;
an optical member that is disposed on the light-emitting side relative to the light source, the optical member covering the aperture of the chassis;
a clamping member that is disposed at an edge of the aperture of the chassis, the clamping member having a first part for engaging the optical member from a side thereof facing the light source, and a second part for engaging the optical member from the light-emitting side, the clamping member being deformed in accordance with a deformation of the chassis; and
a buffer part disposed in at least one of spaces between the optical member and the first part and between the optical member and the second part,
wherein the buffer part has a plurality of mountain-shaped protrusions aligned along a periphery of the edge of the aperture, each of the mountain-shaped protrusions having a rectangular shape in a plan view and a mountain shape in a cross-sectional view and having a top part thereof in contact with the optical member, and
wherein the mountain-shaped protrusions are configured such that, in a cross-sectional view, each of the mountain-shaped protrusions is defined by two inclined surfaces, and a first inclination angle formed by the optical member and a first inclined surface of the two inclined surfaces that is inclined toward an edge of the chassis is larger than a second inclination angle formed by the optical member and a second inclined surface of the two inclined surfaces that is inclined toward a center of the chassis.

2. The illumination device according to claim 1, wherein the buffer part is disposed along an entire periphery of the aperture, and
wherein the mountain-shaped protrusions are aligned such that the second inclined surface is inclined toward the center of the chassis, and the first inclined surface is inclined toward an outside of the chassis.

3. The illumination device according to claim 1, wherein the optical member having recesses formed thereon so as to catch mountain-shaped parts of the mountain-shaped protrusions.

4. The illumination device according to claim 3, wherein the recesses are provided by bonding a sticker having recesses and protrusions on a surface thereof to the optical member.

5. The illumination device according to claim 3, wherein the recesses are formed integrally with the optical member.

6. The illumination device according to claim 1, wherein the buffer part is made of a first layer that is positioned closer to the optical member and a second layer that is positioned closer to the first part or the second part, and the second layer is made of a material that is harder than the first layer.

7. The illumination device according to claim 6, wherein the second layer is configured such that a portion thereof positioned closer to a center of the chassis is thicker than a portion thereof positioned closer to an edge of the chassis.

8. The illumination device according to claim 1, wherein, on the second inclined surface, a low friction layer made of a material having a small friction coefficient is formed.

9. The illumination device according to claim 1, wherein the first part is a supporting section that is a portion of the chassis outside of the edge of the aperture and that is configured to support at least the optical member, and wherein the second part is a frame that extends along the supporting section and that is affixed to the supporting section.

10. A display device, comprising:

the illumination device according to claim 1; and a display panel that performs display by using light from the illumination device.

11. The display device according to claim 10, wherein the display panel is a liquid crystal panel that uses liquid crystal.

12. A television receiver, comprising the display device according to claim 10.

* * * * *